UNITED STATES PATENT OFFICE.

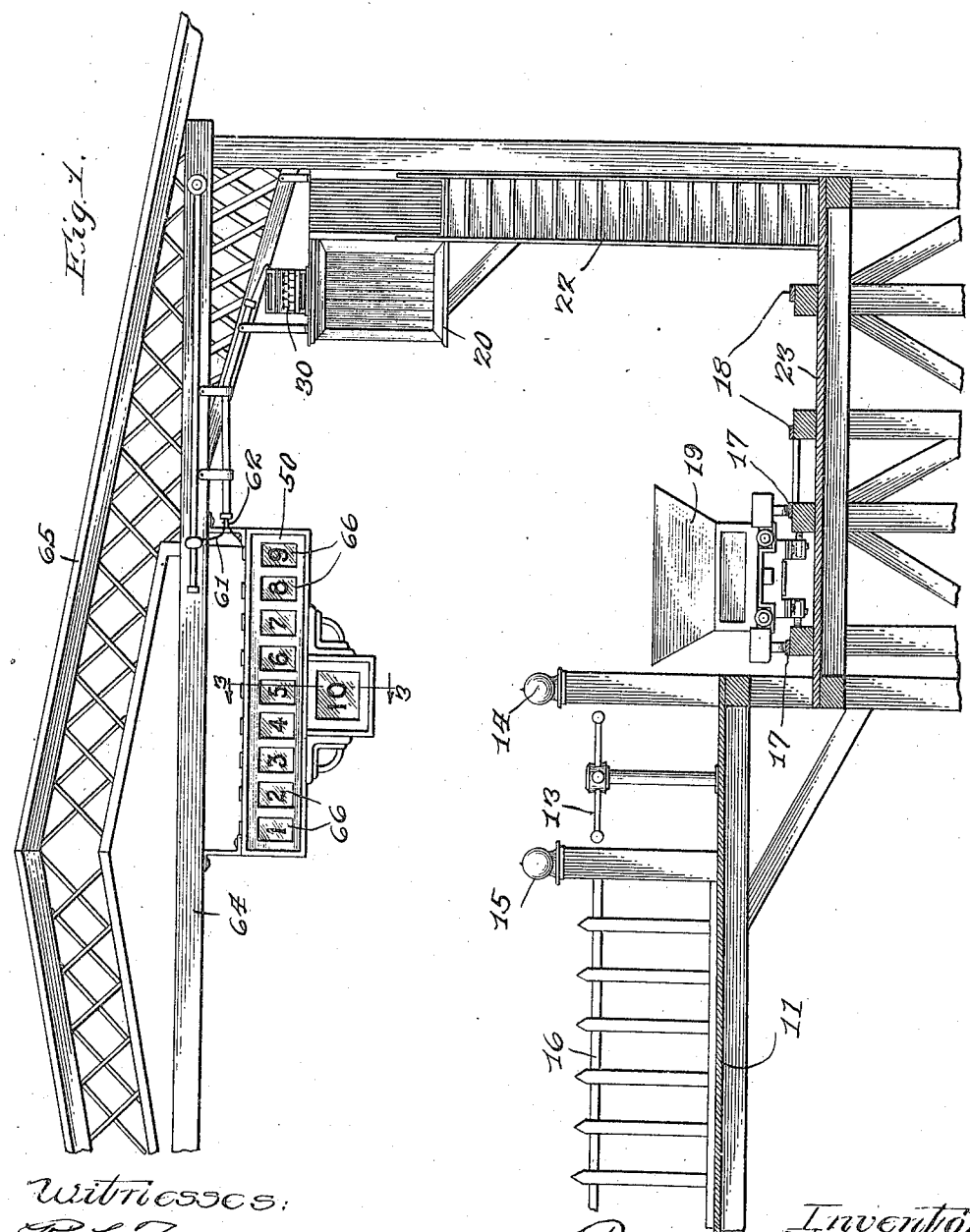

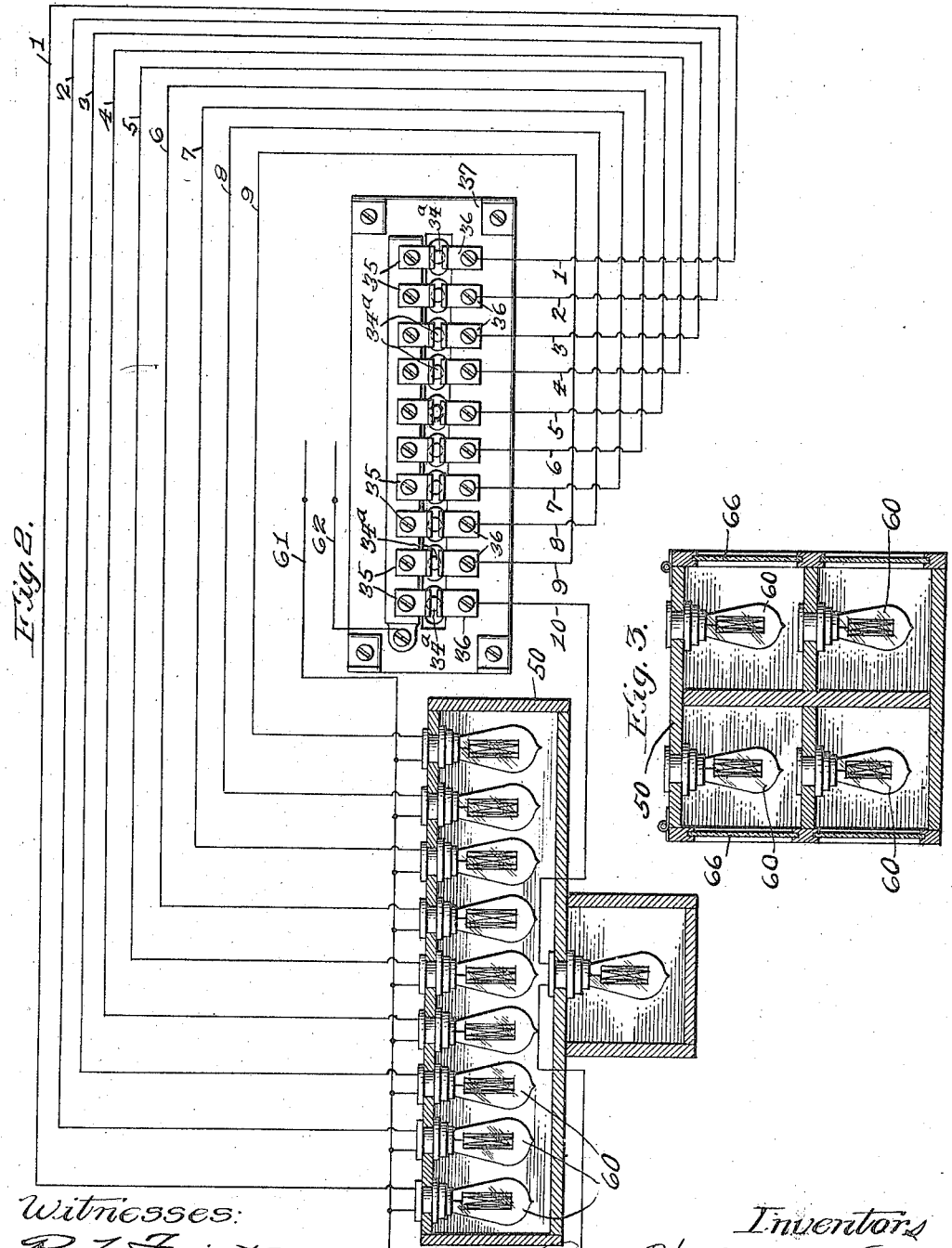

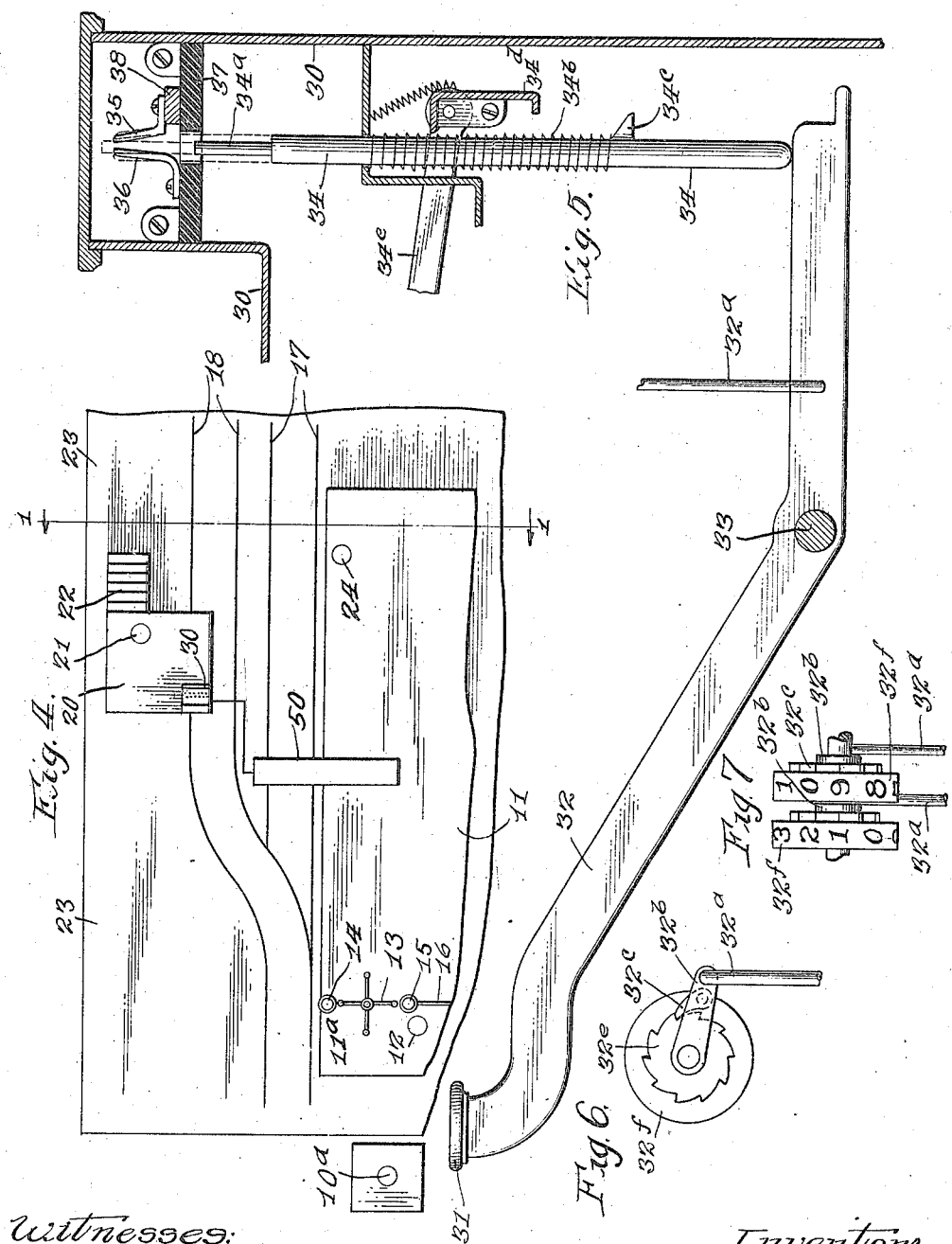

PAUL W. COOPER AND GEORGE A. SCHMIDT, OF CHICAGO, ILLINOIS, ASSIGNORS TO RIVERVIEW PARK COMPANY, OF CHICAGO, ILLINOIS, A CORPORATION OF ILLINOIS.

PLEASURE-RAILWAY.

1,264,159.   Specification of Letters Patent.   Patented Apr. 30, 1918.

Application filed May 23, 1914. Serial No. 840,415.

*To all whom it may concern:*

Be it known that we, PAUL W. COOPER and GEORGE A. SCHMIDT, both citizens of the United States, residing at Chicago, in the county of Cook and State of Illinois, have invented certain new and useful Improvements in Pleasure-Railways, of which the following is a specification.

Our invention relates to pleasure railway constructions, and has for its object a provision of simple and efficient means for facilitating the collection of "second ride" fares, and for registering such fares.

In amusement devices such as pleasure railways, to which the invention is particularly adapted, the patrons or passengers generally purchase tickets before entering the device, of a ticket seller and then pass through a registering turnstile before entering the cars or other portions of the device as passengers. Under such conditions a registering turnstile of course is a check upon the ticket sales by the ticket seller, who will account at the end of the day or other specified period for the number of persons passing through the turnstile, which should of course correspond with the number of tickets collected by the ticket taker. In this manner it will be seen that the record of the automatic turnstile registering device will serve as a check against any collusion between the ticket seller and the ticket taker and prevent any loss to the company, as the number of tickets to be accounted for must check not only with those taken up at the entrance gate, but must also check with the turnstile register which mechanically records the fare for each person passing therethrough. In many cases, however, passengers entering the cars or other vehicles of pleasure railways and the like desire to take a second ride, under which conditions obviously the arrangement of ticket seller, ticket taker and turnstile registering mechanism would not be effective as a check upon the second ride cash collector taking fares from passengers desiring a second ride; and it is the object of the present invention to provide improved registering and signaling mechanism for recording the second ride fares collected, which in most cases will be in the form of currency, and for preventing any fraud on the part of the second fare collectors in failing to turn in second fares collected in cash, and for preventing any fraud due to collusion between the cashier or registering clerk and the second fare collector.

It is a further object of the invention to provide an improved signaling device adapted to be operated by cash register mechanism.

It is a further object of the invention to provide improved mechanism under the control of a cash register device for closing electric circuit connections.

Other objects of the invention will appear in the following specification, which is directed to the preferred embodiment of the invention as illustrated in the drawings and pointed out more particularly in the claims.

In the said drawings,—

Figure 1 is a view of a building partly in elevation and partly in section, forming the station or starting portion of a pleasure railway and illustrating the manner of installing our improved fare registering and signaling mechanism.

Fig. 2 is a diagrammatic view of the electric wiring system, showing the manner in which the signal lights are operated from the ordinary cash register mechanism.

Fig. 3 is a sectional view through the illuminated sign mechanism which is used as a visible indicator.

Fig. 4 is a broken plan view of a portion of the loading platform and associated portions of the fare collecting devices.

Fig. 5 is a broken detail sectional view of a portion of one of the operating keys and associated parts of a cash register, indicating the manner in which the circuits are closed by suitable switch mechanism under the control of the cash register key-bars.

Figs. 6 and 7 are detail fragmentary views of a registering mechanism that may be used in connection with this invention.

The reference character 10ª designates the station of a ticket seller stationed at a suitable booth or other location adjacent to the place of entrance to the amusement device, such booth or station being indicated diagrammatically in Fig. 4. 11 designates generally the main loading platform and 12 is the station or position of the ticket taker who takes up the tickets sold to the prospective customers or passengers by the ticket seller stationed at 10ª just before they pass through the registering turnstile 13, all of which is the ordinary construction and from which it will be seen that the tickets for any given period taken by the collector at 12 must correspond with the funds turned in for the sale of tickets by the ticket seller stationed at 10ª, while the automatic registering turnstile 13 indicating the number of persons or passengers passing therethrough serves as a check against any collusion between the ticket taker stationed at 12 and the ticket seller stationed at 10ª, thus preventing absolutely any fraud or dishonesty upon the first ride ticket sellers and ticket takers. In the diagrammatic view Fig. 4 the loading platform 11 also serves as an unloading platform, the same being divided into two parts by the turnstile 13 and its associated posts 14, 15, and the fence or railing 16 forming a continuation thereof. In the exemplification of the invention as shown in Figs. 1 and 2, only one side of the loading and unloading platform 11 is shown and adjacent the same is a pair of parallel tracks, the rails of which are designated graphically by the reference characters 17 and 18 in Fig. 1, 17 being the outgoing track and 18 the return track, the same reference characters designating the rails of these respective tracks in the sectional view Fig. 1, the latter track having a connection by which the cars on the return from a trip over the system or course may be shunted on to the track 11 to a position where persons in the cars, one of which is shown in Fig. 1 and designated by the reference character 19, may be unloaded on that portion of the platform 11 on the outside of the turnstile 13, such portion of the platform being indicated by the reference character 11ª, Fig. 4.

The portions of the pleasure railway as described form no part of our invention, but are referred to in order to show the manner in which our invention is employed to the best advantage, and the usual operation of such a pleasure railway with respect to loading and unloading of passengers and the collection of fares is as follows. The persons desiring to enter upon the loading platform first purchase tickets entitling them to a single ride from the ticket seller 10ª, which tickets are surrendered to the ticket taker 12 when they enter upon the portion 11ª, after which they immediately pass through the turnstile 13, which is ordinarily and preferably provided with suitable registering means in the ordinary manner, not herein shown, for indicating the number of persons passing through such turnstile, this registering of course being a check upon both the ticket seller 10 and the ticket taker 12, and preventing any collusion between them. Assuming that the pleasure railway is just beginning to be operated, an empty car will be passed from the track 18 over the switching connection on to the track 17 and brought to a position along platform 11, where passengers who have entered through the turnstile 13 upon the main loading portion of the platform 11 may enter the cars. Suitable means for propelling the car will then be employed and the car put in motion and passed outwardly over the track 17 and around the system and will, when it has traversed the system, be returned to a point adjacent the starting platform over the return track 18. The system already shown and described it will be seen furnishes a complete check and record of passengers purchasing first ride tickets and passing through the turnstile 13 and into the cars. When the cars return on track 18 and are switched again onto track 17 they are stopped adjacent portion 11ª of the loading platform, where the passengers desiring to do so alight on the platform and pass thence from the system. It happens, however, that in a large percentage of cases the passengers or patrons will desire to take a second ride and it becomes necessary to have a cash fare collector on the system adjacent the tracks 17 and 18, who may enter upon or come near the cars as soon as the passengers desiring to do so have alighted upon the unloading platform 11ª, where the cash fares for the second ride passengers are collected. After these collections are made the cars, either partially filled or empty if there are no second ride passengers, are passed beyond the turnstile and inclosing fence or railing so that passengers who have paid their fares and passed through the turnstile 13 may enter into the cars alongside the loading platform 11, after which when the cars are loaded they are again passed outwardly over the system or course. It will be apparent that the collectors taking up the fares in cash for the second ride passengers would receive such cash fares without there being any check against the amount of fares to be turned in by them in so far as the system already described is concerned, and it is to provide means for checking against any dishonesty on the part of the cash fare collector or collectors for the second ride that is the object of the invention. A recording clerk is accordingly stationed as, for example, inside the booth 20, as indicated at 21, such booth being preferably, although not necessarily, elevated as shown in Fig. 1, access being had to this booth by a flight of stairs as indicated at 22, leading from the track platform which latter is designated in Figs. 1 and 4 by the reference character 23. On the loading platform 11 will be preferably placed a manager or superintendent of the system, who will be free to move about the platform for the purpose of directing the loading and unloading and general operation of the cars of the system, one position of such person being designated diagrammatically by the reference character 24, Fig.

4. Located in the booth 20 within convenient reach of the recording clerk or cashier 21, is a mechanical device consisting of an ordinary cash register provided with certain modifications to adapt the same to the use of the recording clerk or cashier in recording the number of second rides, that is the number of persons remaining in the cars for a second consecutive trip over the system, and at the same time operating in connection with the cash register mechanism a large illuminated sign for the purpose of indicating to the manager or superintendent of rides 24 on the loading platform or other position conveniently located in relation to the loading and unloading platform for the purpose of indicating to such person the number of second ride cash fares that have been recorded, in order that this superintendent or other person in charge of the rides may ascertain the correctness of such record made by the person operating the register mechanism in the booth by his actually counting the persons remaining in any car for a second consecutive ride. The casing of the registering mechanism is indicated generally by the reference character 30, and 31 is one of the operating keys of the register, the key-bar being designated by the reference character 32 pivoted on the main frame 30 at 33. Since the invention may be employed in connection with the movable key-bars of any commercial form of recording or indicating cash register the details of such mechanism, with the exception of the key-bars and the indicator operating bars 32ª, are omitted from the illustrations shown in the drawings, it being sufficient for the purpose of illustrating the invention to observe that the key-bar 32 is operatively connected with a vertically-moving bar 34, designed in the ordinary cash register to operate indicator mechanism for the purpose of visibly indicating the number or value of a sale which the cash register mechanism has been caused to record. The upper end of the vertically-moving bar 34, however, instead of being provided with the ordinary indicator is provided with a reduced portion as indicated at 34ª, which is adapted to enter between two spring terminals 35, 36 of an electric knife switch for the purpose of closing an electric circuit and operating a visible sign or signal indicating to the superintendent or manager 24 on the platform 11 the number of second ride cash fares that have been recorded before each car begins completing its load by taking on passengers for a first ride who have paid their fares and passed through the turnstile 13. This signaling or indicating mechanism comprises a relatively large illuminating sign placed in a conspicuous position immediately over the loading side of the platform 11 and is indicated generally by the reference character 50. (See Figs. 1 and 4.) As will be seen by an inspection of Fig. 1, this illuminating sign is suspended from a portion 64 of the superstructure, which is preferably provided with a covering or roof 65 for the purpose particularly of shielding the loading and unloading platform and adjacent portions of the system.

In Fig. 3 we show a sectional view taken approximately on the line 3—3 Figs. 1 and 2. Since it is necessary that the number of second ride cash fares recorded on the cash register mechanism 30 shall be indicated so that the superintendent 24 may view the sign from any portion of the loading platform 11 it is necessary that the sign 50 be arranged to signal in both directions of the longitudinally arranged platform. For this reason the sign is preferably in the form of a double cabinet divided into a plurality of compartments, each provided with a transparent or semi-transparent window 66, with electric lights on the interior of each compartment, the transparent or semi-transparent windows of the compartment being marked with suitable designating characters as the numbers 1 to 10 inclusive, shown in Fig. 1.

In the present embodiment of the invention the trains of our system are designed to carry approximately 18 people and therefore the number of compartments in the sign is adequate for indicating the number of second ride cash fares that may be collected for any car or train of cars up to and including 19 persons or fares. It will be apparent that the casing 50 of the sign may, however, be divided into any desired number of illuminating compartments either more or less than those illustrated herein, in order to meet various conditions. In the particular form of sign herein shown it will be seen that illuminating compartments provided with numeral sign windows from 1 to 9 inclusive are provided in the top row on both sides of the sign, while suspended from the under side of the sign are two supplementary compartments with illuminated windows bearing the numeral 10. On the interior of the casing 50 and within each of the ten compartments as described suitable electric lamps are provided as indicated by reference character 60, there being a single lamp in each of the 20 compartments. Since in the present embodiment of the invention the illuminating sign 50 is shown provided with 10 different numerical compartments, at least 10 designating keys on the register mechanism 30 will be required, and these keys 31 will therefore be designated from 1 to 10 respectively.

In Fig. 2 a wiring diagram is shown illustrating the electrical connections between the switch mechanism of the cash registering mechanism and the electrical signaling device or sign. In this figure an enlarged top plan view of the switch mechanism of the cash register is shown, and the illuminating sign or signaling device is shown in vertical longitudinal section. 37 is an insulating plate secured in the upper indicating portion of the cash register main frame, and 38 is a bus-bar resting upon the insulating plate 37 and to which each of the switch members 35 is connected. Each of the electric lamps 60 of the illuminating sign is connected with the terminal feed wire 61, leading to a suitable source of current supply. While we have shown in Fig. 4 and described only one of the key-bars 32 and its coöperating switch mechanism, it will be apparent that in the embodiment of the invention shown there will be ten of these key-bars 32 and ten of the switch mechanisms as shown in Fig. 2, including ten of the vertically moving bars 34, each provided with the switch member 34$^a$ on their upper extremity, as shown also in Fig. 2. It will be seen that each of the members 35 of the knife switches is connected to the bus-bar 38 while in electrical connection with the bar 38 is the other circuit wire leading to the source of current supply which is designated by the reference character 62. The electrical connections between the switch mechanism and the lamps 60 and the various compartments designated by the numerals 1 to 10 inclusive are designated by the reference characters 1 to 10 in Fig. 2, thus corresponding with the numbers of the compartments with which their respective lights serve.

The operation of the mechanism in recording second ride fares will be as follows: Assuming that a car or train that has been over the system with a number of first ride passengers comes in over the return track 18 and is shunted onto the outgoing track 17, being stopped opposite the outer end 11$^a$ of the unloading platform where the passengers desiring to do so will alight and pass over the platform and away from the system. Assuming that all of the passengers except one leave the car or train and one of the passengers desires a second ride, the operation will be as follows. Before the car or train is passed beyond the turnstile 13 to the loading portion of the platform, the recording clerk or cashier stationed at 21 will note the single passenger in the car or train desiring a second ride and will press the key of the register 30, which key is marked 1. The depression of the key 1 will elevate the opposite extremity of the key-bar 32 and also reciprocate vertically the plunger 34 against the action of the coil spring 34$^b$, which will cause the switch member 34$^a$ to enter between the switch contacts 35, 36 and will close the circuit number 1 leading to lamps in compartments designated by the numeral 1, Fig. 1, showing on each side of the illuminating sign 50. It will be seen that the recording clerk or cashier would operate only one key with the number 1 thereon in recording the single second ride passenger. Suppose for illustration, however, that he should count sixteen second ride passengers remaining in the train. To record this number of second ride passengers it would be necessary for him to employ two keys. He would therefore first press the key 10, which would light the designating compartment 10 of the illuminating sign, and while this remained lighted, he would also press the key 6 which would close the circuit and light the compartment indicated 6 in the sign 50, all of which would indicate to the superintendent or person in charge of the loading platform that the recording clerk or cashier had recorded on the register mechanism a total of ten plus six fares, or sixteen second ride fares in all. While it is not shown in the wiring diagram it is preferred that since there are two No. 1 compartments in the sign, each of the lamps in the compartments marked No. 1 shall be wired in the same circuit in a well known manner not herein necessary to be shown. The circuit lighting lamp No. 1 in the diagram as shown in Fig. 2 will be as follows: feed wire 61 to the lamp, thence through circuit marked 1 to switch member 36, the closure member 34$^a$ and the switch member 35 to bus-bar 38 and return feed wire 62, which will cause the lamp in compartment No. 1 to light and preferably cause the lamps in both compartments No. 1 showing on each side of the sign to light by wiring both lamps in this circuit. The circuits for each of the remaining lamps from 2 to 10 inclusive may be traced in like manner.

The vertically moving plunger 34 carrying switch member 34$^a$ may be provided with a detent as indicated at 34$^c$ and also may engage member 34$^d$ pivoted to lever 34$^e$, the latter being of the usual form in cash register devices for retaining and locking the plunger 34 in the elevated position until another one of the key-bars is operated which automatically releases the previously operated plunger 34 and hence would open the switch mechanism controlled thereby. By means of this construction it will be seen that when the recording clerk or cashier operates the register to record the number of second ride patrons remaining in any given car or train, the electric circuit leading to the corresponding designation on the illuminated sign 50 over the loading platform will remain closed and the designating lamp accordingly lighted up until released by the recording clerk or cashier either purposely or by recording the second rides of the subsequent car or train.

It will be apparent that the complete value of the invention will only be obtained when operated where a cash registering device is employed which makes a permanent mechanical record of the number of second ride fares recorded by the machine and flashed upon the sign, such recording devices, however, comprising the equipment of ordinary commercial cash registers of the type herein referred to, and since such recording mechanism forms no part of the present invention the same is not illustrated, just as the recording mechanism ordinarily forming part of the turnstile mechanism 13 heretofore referred to is omitted from the present disclosure.

In view of the above explanation of the operation of the device, the advantages of the second ride fare recording mechanism will be apparent, for with the superintendent or manager on the loading platform he is in a position to inspect the number of second ride passengers that remain in each car as it is brought to the loading platform and by merely glancing upwardly toward the illuminating sign he can determine whether or not the recording clerk has from the elevated position in the booth 20 recorded the correct number of second ride passengers. Obviously the money collected by the second ride fare collectors must correspond with the record made by the recording clerk or cashier on the mechanism as described, which constitutes the present invention.

In Figs. 6 and 7, we have shown a form of accumulating or totalizing register mechanism adapted to be operated from one of the key bars 32. While certain connections between the key bars and the registers are indicated as at 32$^a$ and 32$^b$, and the actuating pawl 32$^c$, which engages ratchet wheel 32$^e$ adapted to move the register wheel 32$^f$, the form of registering and totalizing device to be employed in connection with the key bars 32 is immaterial, as any well known registering means designed to be actuated by the key bars of machines of this character may be employed in connection with the invention herein shown and described.

In order that the invention might be understood the details of the preferred embodiment have been specifically shown and described, but it is not desired to be limited to the exact details, for it will be apparent that the invention may be employed to advantage under various conditions and for other purposes than shown and described in the present embodiment thereof.

We claim:

1. In combination, an unloading platform; a loading platform separated from the unloading platform; a track extending along and adjacent said platforms; a passenger vehicle on said track adapted to stop at the unloading platform and discharge such passengers as desire to leave said vehicle, and carry other passengers to the loading platform; and an elevated booth adjacent said platforms adapted to facilitate observing passengers on said vehicle while the latter passes from the unloading platform to the loading platform.

2. In combination, an unloading platform; a loading platform separated from the unloading platform; a passenger vehicle adapted to pass by and stop at the unloading and loading platforms consecutively; an elevated observation booth adjacent and in full view of said platforms; and means operable from the observation booth for indicating the number of persons in said vehicle while the latter is moving from the unloading platform to the loading platform.

In testimony whereof we have signed our names to this specification, in the presence of two subscribing witnesses, on this 20th day of May, A. D. 1914.

PAUL W. COOPER.
GEORGE A. SCHMIDT.

Witnesses:
O. R. HODGES,
FRANK MOORE.

Copies of this patent may be obtained for five cents each, by addressing the "Commissioner of Patents, Washington, D. C."